United States Patent
Dockter

(10) Patent No.: US 9,314,922 B2
(45) Date of Patent: Apr. 19, 2016

(54) REMOTELY OPERATED MANIPULATOR AND ROV CONTROL SYSTEMS AND METHODS

(71) Applicant: Daniel J. Dockter, Hyde Park, VT (US)

(72) Inventor: Daniel J. Dockter, Hyde Park, VT (US)

(73) Assignee: Control Interfaces LLC, New York, NY (US)

( * ) Notice: Subject to any disclaimer, the term of this patent is extended or adjusted under 35 U.S.C. 154(b) by 85 days.

(21) Appl. No.: 14/175,540

(22) Filed: Feb. 7, 2014

(65) Prior Publication Data

US 2015/0224638 A1   Aug. 13, 2015

(51) Int. Cl.
*B25J 13/08* (2006.01)
*B25J 3/04* (2006.01)
*B25J 9/16* (2006.01)
*B25J 13/02* (2006.01)
*B25J 13/04* (2006.01)

(52) U.S. Cl.
CPC ....... *B25J 3/04* (2013.01); *B25J 9/1689* (2013.01); *B25J 13/025* (2013.01); *B25J 13/04* (2013.01)

(58) Field of Classification Search
CPC .............. B25J 3/00; B25J 3/04; B25J 9/1615; B25J 9/1635; B25J 13/02; B25J 13/025; B25J 13/04; B25J 13/06; B25J 13/08; B25J 13/081; B25J 13/084; B25J 13/087; B25J 13/088; B25J 13/089; B25J 9/1005; B25J 9/1015; B25J 9/102; B25J 9/1035; B25J 9/1075
USPC .................................................. 700/257, 264
See application file for complete search history.

(56) References Cited

U.S. PATENT DOCUMENTS

| | | | |
|---|---|---|---|
| 4,068,156 A | 1/1978 | Johnson et al. | |
| 5,019,761 A | 5/1991 | Kraft | |
| 5,264,768 A | 11/1993 | Gregory et al. | |
| 5,650,704 A | 7/1997 | Pratt et al. | |
| 5,828,813 A * | 10/1998 | Ohm ................... | A61B 19/2203 700/260 |
| 5,898,599 A | 4/1999 | Massie et al. | |
| 6,016,385 A * | 1/2000 | Yee ............................ | B25J 3/04 446/327 |
| 6,120,433 A | 9/2000 | Mizuno et al. | |
| 6,353,773 B1 * | 3/2002 | Takenaka ............... | B25J 9/1689 318/568.1 |
| 6,430,473 B1 * | 8/2002 | Lee .......................... | B25J 9/162 318/568.16 |
| 6,916,074 B2 | 7/2005 | Jung et al. | |
| 7,231,837 B2 | 6/2007 | McCoy, Jr. | |

(Continued)

OTHER PUBLICATIONS

International Search Report and Written Opinion mailed May 14, 2015 in related International Application No. PCT/US2015/014170.

(Continued)

*Primary Examiner* — Stephen Holwerda

(74) *Attorney, Agent, or Firm* — Eric L. Lane; Green Patent Law

(57) ABSTRACT

Manipulator systems and methods are provided in which there is at least one slave manipulator assembly and at least one controller assembly in communication with the slave manipulator assembly. The controller assembly is configured to remotely operate the slave manipulator assembly, and the slave manipulator assembly provides feedback information to the controller assembly. The feedback information may include a measure of an amount of resistance or movement on the slave manipulator assembly. The systems and methods may be configured to automatically switch between at least two modes of operation when an amount of resistance or movement on the slave manipulator assembly fluctuates above and below a threshold amount of resistance or movement on the slave manipulator assembly.

21 Claims, 13 Drawing Sheets

(56) References Cited

U.S. PATENT DOCUMENTS

| | | |
|---|---|---|
| 7,466,099 B2 | 12/2008 | McCoy, Jr. |
| 7,623,945 B2 | 11/2009 | Kraft |
| 7,774,177 B2 | 8/2010 | Dariush |
| 8,624,537 B2 | 1/2014 | Nowlin et al. |
| 2007/0193442 A1 | 8/2007 | McCoy |
| 2009/0248038 A1 | 10/2009 | Blumenkranz et al. |
| 2011/0137464 A1* | 6/2011 | Sabater Navarro .. A61H 1/0274 700/264 |
| 2011/0277776 A1 | 11/2011 | McGrogan et al. |
| 2012/0089254 A1 | 4/2012 | Shafer et al. |
| 2012/0185098 A1 | 7/2012 | Bosscher et al. |
| 2012/0185099 A1 | 7/2012 | Bosscher et al. |
| 2012/0328395 A1 | 12/2012 | Jacobsen et al. |
| 2013/0011220 A1 | 1/2013 | Jacobsen et al. |

OTHER PUBLICATIONS

Kraft KMC 770 Operator Control Unit with Force Feedback Mini-Master©, available at http://kraftelerobotics.com/gallery/index.php?gallery=.&image=mini-master.jpg.

DevinSense Geomagic® Phantom® Products Description, available at http://www.devinsense.com/products/geomagic-premium-6dof/.

3D Systems Geomagic Sculpt product brochure, available at http://geomagic.com/en/products/sculpt/overview.

* cited by examiner

REMOTELY OPERATED MANIPULATOR AND ROV CONTROL SYSTEMS AND METHODS

FIELD

The present disclosure relates to remotely operated manipulators and related systems and methods.

BACKGROUND

Remotely operated robotic arms (often called "manipulators" or "slave arms") are used to carry out automated or unplanned tasks requiring precise dexterity in locations inaccessible to humans due to environmental constraints. Typical environmental constraints are any factors deemed too hazardous for human access, such as work site radiation levels and atmospheric pressures beyond safe human limits. Because of these environmental constraints, unknown worksite conditions, forces within the operating environment and the unknown or unstable nature of the environment, articulated control in the form of joint positions is usually preferable to Cartesian, selective compliant articulated robot arm (SCARA), or Delta control.

Among the clear and pressing needs for remotely operated robotic systems, perhaps the most urgent is to limit the impact of an environmental disaster, whether a natural disaster or human-induced. Such systems are particularly useful where exposure time is paramount in mitigating effects on the environment and on people engaged in necessary repairs, such as the Fukushima Daiichi nuclear disaster and the Hercules 265 natural gas blowout disaster, or where human intervention is not even possible, such as the subsea Deepwater Horizon oil spill disaster.

Most controls for existing remotely operated systems require the system operator, be it human or automated, to control the robotic manipulator without the benefit of physical feedback beyond haptics or visual indicators. However, such systems have major disadvantages. The most obvious performance inefficiency of current technology is the inability of the manipulators to react quickly and accurately enough to operator input intent and the inability of operators to transpose the intended motion through existing control inputs. Thus, there is a need for a remotely operated manipulator system that provides better control inputs, which, in turn, improve translation of operator intent into actual motion of the manipulator and also improve the operator's sensation of what the manipulator is encountering in the remote environment. Similarly, there is a need for a system that emulates human motions and perceptions, such that it is easier, more intuitive and more effective for human operators to use.

Currently available remotely operated robotic systems have several specific drawbacks. First, current technology lacks effective manipulator (sometimes referred to as a "slave arm") feedback through reaction forces on the controller input mechanisms of the system. Moreover, most systems require the use of different input mechanisms for different control modes of the manipulators. Also, switching control modes in currently available systems typically interrupts input motion, disrupts operation, and leads to less effective manipulator operation.

Accordingly, there is a need for remotely operated manipulator systems and methods that provide better control inputs so as to improve translation of operator intent into actual motion of the manipulator. There is also a need for remotely operated manipulator systems and methods that facilitate slave manipulator feedback to the "master" controller arm of the input system. There is a further need for remotely operated manipulator systems and methods that use the same input mechanisms to control all manipulator joints simultaneously regardless of the control mode. Finally, there is a need for remotely operated manipulator systems and methods that seamlessly switch control modes without interrupting input motion during operation.

SUMMARY

Embodiments of the present disclosure alleviate, to a great extent, the disadvantages of known systems for remotely operating manipulators by providing manipulator control systems and methods that facilitate feedback from the manipulator arm assembly back to the input systems such as controller arm assemblies, use the same input mechanism regardless of the control mode being used, and automatically switch control modes without interrupting operation. Exemplary embodiments disclosed herein include naturally and intuitively controlled remotely operated manipulators and remotely operated vehicle (ROV) systems to provide human presence of mind in rapidly changing conditions while maintaining the ability to integrate selectable automation.

Also described are methods of control and switching control modes, such as between types of rate-controlled and spatially correspondent position-controlled modes of operation of slave manipulators either when selected or automatically, due to an impact (or other factor) in the remote work environment, thereby providing a reaction force at the master arm input due to the operation of the enclosed embodiment that increases the operator's input fidelity without the use of hydraulics in the master controller. Disclosed systems and methods achieve teleoperation force feedback using the power and durability of hydraulics with the precision and sensitivity of electronics.

Exemplary embodiments of disclosed manipulator systems comprise at least one slave manipulator assembly and at least one controller assembly in communication with the slave manipulator assembly. The controller assembly is configured to remotely operate the slave manipulator assembly. The slave manipulator assembly provides feedback information to the controller assembly, and the feedback information includes a measure of an amount of resistance or movement on the slave manipulator assembly. In exemplary embodiments, the manipulator system further comprises a right-footed master device and a left-footed master device. As discussed in more detail herein, the dual-pedal foot controller can send electronic signals based on pedal motion to a computer for manipulator carrier vehicle positioning and translation.

The system may be configured to automatically switch between at least two modes of operation. In exemplary embodiments, the system's primary mode of operation is spatially correspondent mode, and the system automatically switches to a type of rate control mode when the amount of resistance on the slave manipulator assembly meets or exceeds a threshold amount of resistance. The amount of resistance, whether above or below the threshold, may vary and is measurable to the degree above or below the threshold. The system may automatically switch to spatially correspondent mode when the amount of resistance or movement on the slave manipulator assembly drops below the threshold amount of resistance or movement.

In exemplary embodiments, the controller assembly is an actuator sensor system. The actuator sensor system may comprise electroactive polymer material. In exemplary embodiments, the actuator sensor system may comprise a drive train assembly. The drive train assembly may include a drive shaft, a torque sensor connected to the drive shaft, a drive device connected to the drive shaft, a gear drive, such as a reduction drive, connected to the drive device, an engagement mechanism connected to the drive device, and an angular movement detector connected to the drive device. In exemplary embodiments, the engagement mechanism includes a series of electroactive polymer materials.

Exemplary embodiments of manipulator systems comprise at least one slave manipulator assembly and at least one controller assembly in communication with the slave manipulator assembly. The controller assembly is configured to remotely operate the slave manipulator assembly. In exemplary embodiments, the system is configured to automatically switch between at least two modes of operation when an amount of resistance or movement (or other detectable environmental factor) on the slave manipulator assembly fluctuates above and below a threshold amount of resistance or movement (or other detectable environmental factor) on the slave manipulator assembly. In exemplary embodiments, the slave manipulator assembly provides feedback information to the controller assembly, and the feedback information includes a measure of the amount of resistance or movement (or other detectable environmental factor) on the slave manipulator assembly.

In exemplary embodiments, the manipulator system is operable in spatially correspondent mode or a type of rate control mode and the primary mode of operation is spatially correspondent mode. In exemplary embodiments, the manipulator system automatically switches to a type of rate control mode when an amount of resistance or movement on the slave manipulator assembly meets or exceeds a threshold amount of resistance or movement. The manipulator system may also automatically switch back to spatially correspondent mode when the amount of resistance or movement on the slave manipulator assembly drops below the threshold amount of resistance or movement.

In exemplary embodiments of a manipulator system, the controller assembly includes an engagement mechanism that engages when the amount of resistance or movement on the slave manipulator assembly meets or exceeds a threshold amount of resistance or movement. The engagement mechanism may disengage when the amount of resistance or movement on the slave manipulator assembly drops below the threshold amount of resistance or movement. The controller assembly may move independently of the slave manipulator assembly until the affected joint position of the slave manipulator assembly is synchronized with the affected joint position of the controller assembly.

In exemplary embodiments, the controller assembly is an actuator sensor system comprising a drive train assembly. The drive train assembly may comprise multiples of a drive shaft, an energy absorbing device connected to the drive shaft, a torque sensor connected to the drive shaft, a drive device connected to the drive shaft, a gear drive, such as a reduction drive, connected to the drive device, an engagement mechanism connected to the drive device, and an angular movement detector connected to the drive device.

Exemplary embodiments include a method of controlling a remotely operated system, comprising using a controller assembly to control and position a slave manipulator assembly, receiving feedback information from the slave manipulator assembly, and automatically switching between multiple modes of operation. The feedback information may include a measure of resistance or movement (or other detectable environmental factor) on the slave manipulator assembly. The method may automatically switch between at least two modes of operation when an amount of resistance or movement on the slave manipulator assembly fluctuates above and below a threshold amount of resistance or movement on the slave manipulator assembly. The measure of resistance, movement or other environment factor may comprise one or more of pressure, electric force, electro-magnetic force, acceleration, torque, or any other measurable change.

In exemplary embodiments, a method may further comprise operating in spatially correspondent mode if the amount of resistance or movement on the slave manipulator assembly remains below a threshold amount of resistance or movement. Exemplary embodiments may further include automatically switching to operation in a type of rate control mode if the amount of resistance or movement on the slave manipulator assembly meets or exceeds the threshold amount of resistance or movement. Exemplary embodiments may also comprise engaging a braking mechanism, such as a clutch, when the amount of resistance or movement on the slave manipulator assembly meets or exceeds a threshold amount of resistance or movement and decoupling a braking mechanism when the amount of resistance or movement on the slave manipulator assembly drops below the threshold amount of resistance or movement.

Accordingly, it is seen that manipulator systems and associated methods are provided. The disclosed assemblies and methods facilitate feedback from the slave manipulator assembly to the controller assembly, use the same input mechanism regardless of the control mode being used, and automatically switch control modes without interrupting operation. These and other features and advantages will be appreciated from review of the following detailed description, along with the accompanying figures in which like reference numbers refer to like parts throughout.

BRIEF DESCRIPTION OF THE DRAWINGS

The foregoing and other objects of the disclosure will be apparent upon consideration of the following detailed description, taken in conjunction with the accompanying drawings, in which.

DETAILED DESCRIPTION

Figure 1:
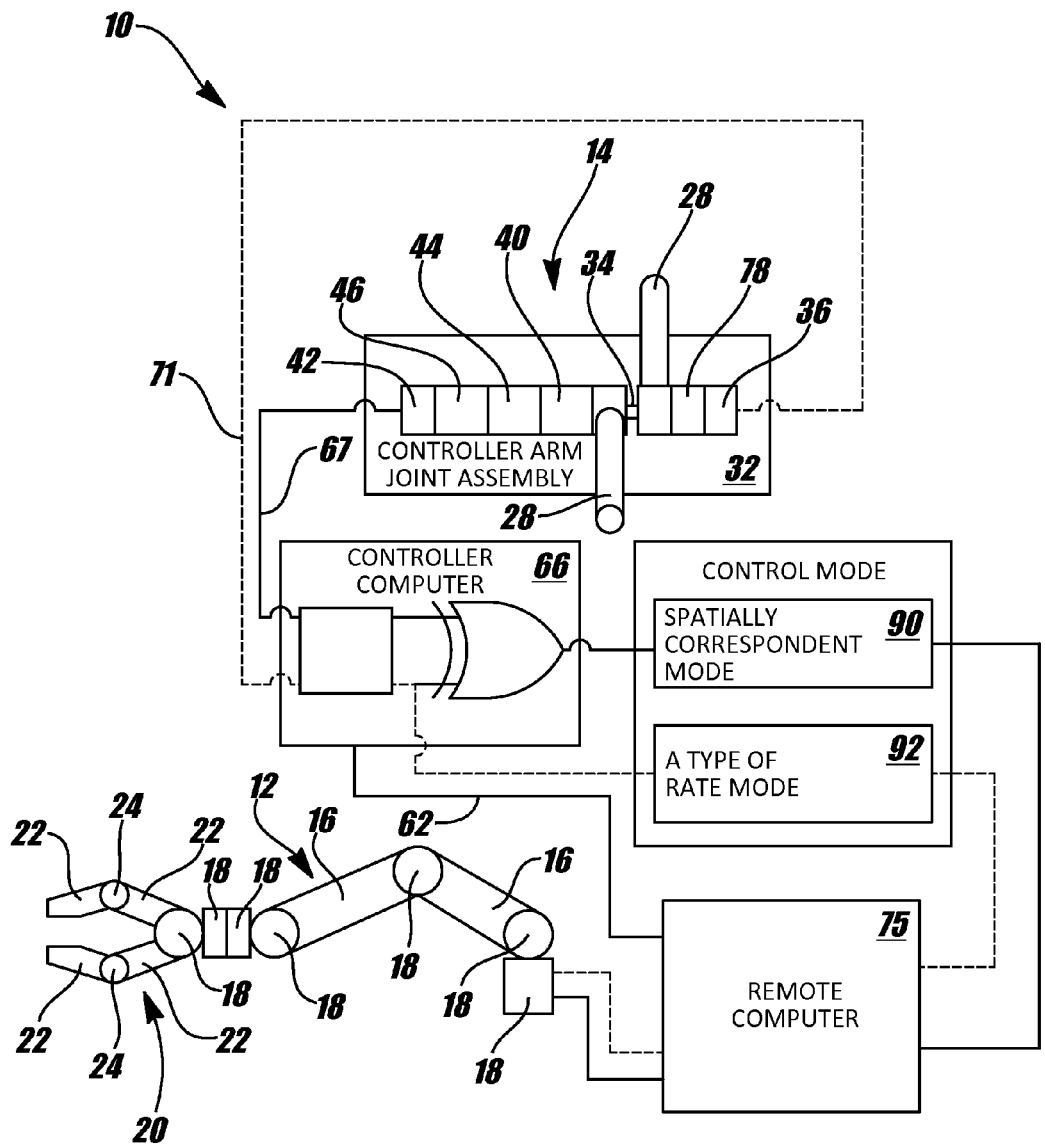
FIG. 1 is a schematic of an exemplary embodiment of a manipulator system and method in accordance with the present disclosure.

In the following paragraphs, embodiments will be described in detail by way of example with reference to the accompanying drawings, which are not drawn to scale, and the illustrated components are not necessarily drawn proportionately to one another. Throughout this description, the embodiments and examples shown should be considered as exemplars, rather than as limitations of the present disclosure. As used herein, the "present disclosure" refers to any one of the embodiments described herein, and any equivalents. Furthermore, reference to various aspects of the disclosure throughout this document does not mean that all claimed embodiments or methods must include the referenced aspects.

In general, embodiments of the present disclosure relate to remotely operated manipulator systems and methods that provide manipulator feedback through reaction forces (or other detectable changes or environmental factors) on the controller input mechanisms. Exemplary methods and systems of controlling remotely operated manipulators and ROV systems are provided, comprised of any combination of one or more slave manipulators, electroactive polymer (EAP) or any other artificial muscle or other sensor/actuators, a rotary encoder, servo motor, brake, reduction gear assemblies, rotation shaft, damper spring, torque-sensor, and one or more arm segments or digital representations of the forces and components comprised of a slave manipulator and master controller. In exemplary embodiments, mechanical forces are transposed from joint positions and hydraulic fluid pressures during actuation that reflect the limitations of the slave manipulator due to an impact or other detectable change in the slave manipulator work environment. Exemplary embodiments switch between at least two modes of operation when the amount of resistance, movement or other environmental factor on the slave manipulator fluctuates above or below a threshold amount of resistance, movement or other environmental factor on the slave arm.

Exemplary embodiments of manipulator systems may use torsionally loaded mechatronic input mechanisms and data representative of the slave manipulator. Exemplary systems and methods may simultaneously employ input forces, reaction forces, position, and pressure sensors to implement a digital logic gate of XOR, or "exclusive disjunction" in Boolean terms, meaning either the primary mode or the secondary mode are always transmitted, but not both, and not neither. The primary exclusive function in the logic gate, also referred to as the nominal or default control mode, may be the spatially correspondent, closed-loop control mode. The secondary exclusive function may be a type of rate control mode. Exemplary embodiments are not limited to operation with unilateral or bilateral feedback, but rather can provide elements of both, referred to as hybrid feedback.

Exemplary embodiments react quickly and accurately to operator input intent and allow operators to feel the transposed reaction forces and motion of the manipulator and to feel the control mode switching through the control inputs. The ability to switch control modes during controller motion and to feel the control mode switching are abilities not provided by currently available control systems. In exemplary embodiments, the manipulator controller interface provides feedback to the operator. In addition, embodiments of the disclosed ROV positioning and translation foot pedal control interface strap securely over operator footwear and use visual feedback via ROV cameras and indicators on monitors. Systems and methods of the present disclosure are especially well-suited to disaster scenarios where the manipulator must operate in limited or zero visibility where increased dexterity is needed, such as a petroleum or organic debris plume. Moreover, exemplary embodiments are better equipped to handle material that cannot be easily manipulated with end effectors (for example because they are not designed to interface with the manipulators) or because the material shape or conditions have changed.

Figure 2:
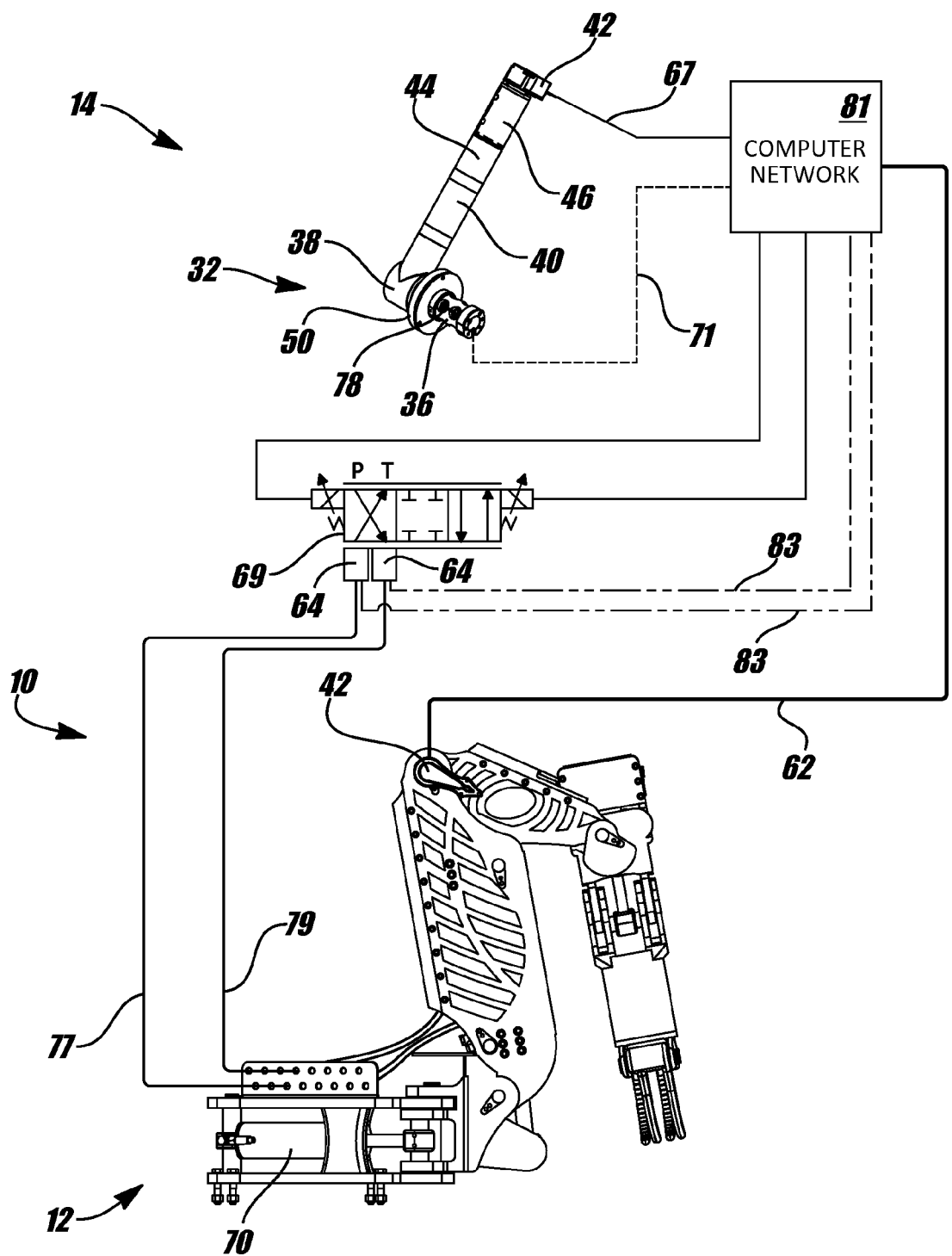
FIG. 2 is a schematic of an exemplary embodiment of a manipulator system and method and a perspective view of an exemplary embodiment of a controller assembly in accordance with the present disclosure.

FIGS. 1 and 2 provide an overview of an exemplary manipulator system 10 including at least one slave manipulator assembly 12 and at least one controller assembly 14 in communication with the slave manipulator assembly 12. The slave manipulator assembly 12 may comprise one or more arm segments 16 connected by joints 18 with a gripper assembly 20 at the distal end of the arm assembly 12. The gripper assembly 20 may include one or more end effector segments 22 connected by end effector joints 24. Other components for facilitating movement and communication may be provided with the slave manipulator assembly 12, such as proportional directional valves 69, and a hydraulic cylinders 70. At least one controller assembly 14 is provided for the user to control the manipulator system 10. The controller assembly 14, essentially a master controller arm system, may comprise one or more movable arm segments 28 connected by joints 30. In exemplary embodiments, the controller assembly 14 is configured with one joint 30 corresponding to each joint 18 of the slave manipulator assembly 12. In an exemplary default mode, each joint 18 of the slave manipulator assembly 12 follows the motion of the controller assembly 14 according to the position of the corresponding joint 30.

In exemplary embodiments, the controller assembly 14 is an actuator sensor system, i.e., an electromechanical input and movement control mechanism, which may comprise a drive train assembly 32, which can be liquid cooled and/or may be made of an electroactive polymer material (EAP) 80, or any other form or combination of artificial muscle materials such as carbon nanotube fibers, silver nanowires, fluidic or pneumatic muscles, or the sensing of human muscles. With reference again to FIGS. 1 and 2, an exemplary drive train assembly 32 may comprise a drive shaft 34 and different combinations of components connected thereto for actuating the slave manipulator assembly 12. In exemplary embodiments, a torque sensor 36 and a right angle drive device 38 are connected to the drive shaft 34, a reduction gear drive 40 is operatively connected to the right angle drive device 38. The right angle drive device 38 may be a reduction gear drive or any other type of drive sufficient to move the controller assembly 14, and the reduction gear drive 40 may be a planetary gear. In exemplary embodiments, an energy absorber (torsion spring) may be added to the torque sensor 36.

A measuring device 42 and engagement mechanism 44 may be connected to the right angle drive device 38. In exemplary embodiments, the measuring device 42 is a rotary encoder or angular movement detector that sends a joint position signal 67 to controller computer 66, and the engagement mechanism 44 can be any kind of brake for engaging and fixing the controller assembly shaft 34 to the controller torque sensor 36 when the amount of resistance or movement on the slave manipulator assembly 12 exceeds a threshold amount. As discussed below, the engagement mechanism 44 may also be comprised of or include an electroactive polymer (EAP) material or a series of such materials. The torque sensor 36 detects the amount of torque imposed on the slave manipulator assembly 12. In exemplary embodiments, the torque sensor 36 is located at the proximal end of the drive shaft 34 and may be adjacent a thrust bearing 50 that allows rotation of the various components of the controller assembly 14.

Figure 8:
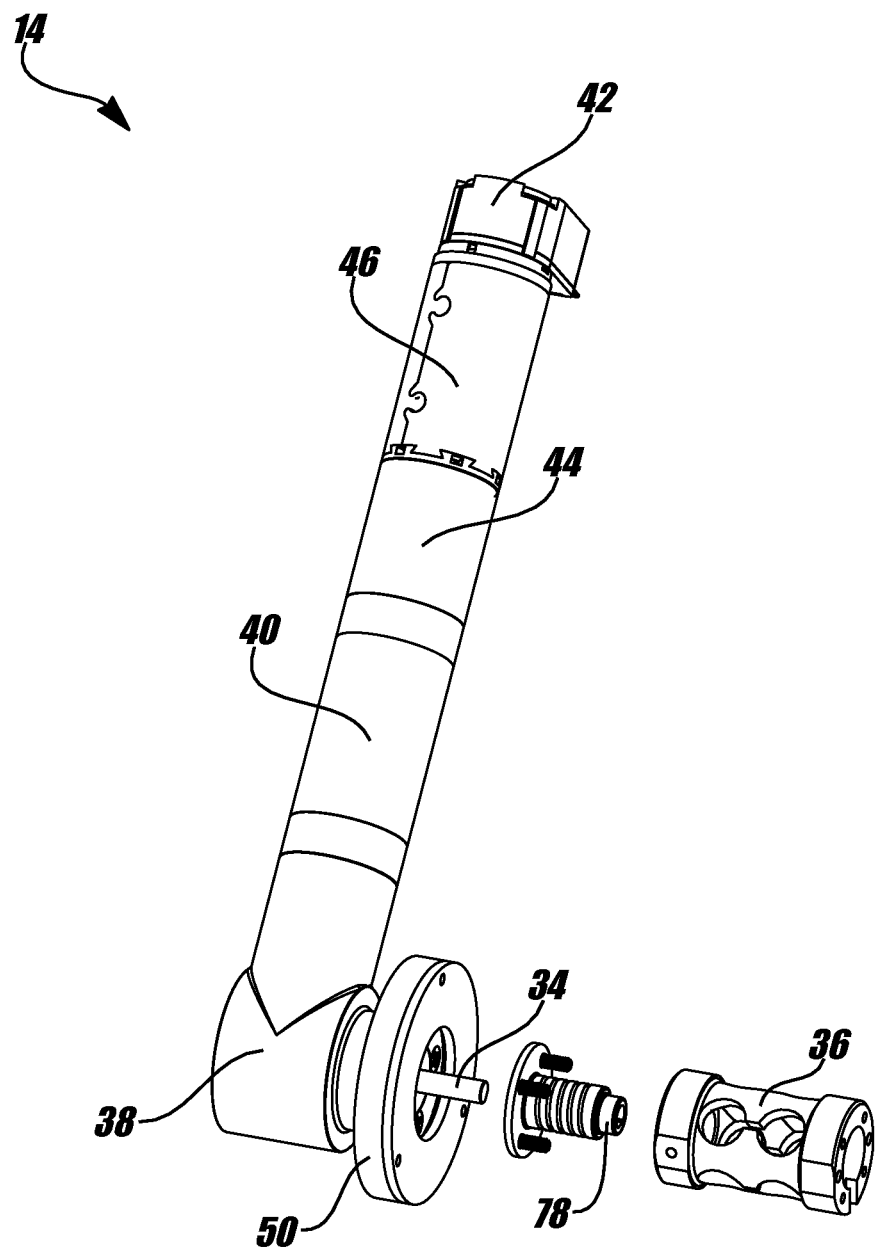
FIG. 8 is a perspective view of an exemplary embodiment of a controller assembly in accordance with the present disclosure.

As best seen in FIGS. 2 and 8, in exemplary embodiments the drive device 38 is a right angle drive, and the connected components or subassemblies pivot about the operational longitudinal axis of the torque sensor 36 and torsion spring 78. Then the brake 44, when engaged, changes the input torque of the torque sensor 36 on the opposing subassembly. A servo motor 46 may be provided as part of the controller assembly 14 in some embodiments. In an exemplary embodiment, the servo motor 46 is located between the angular measuring device 42 and the engagement mechanism 44. The servo motor 46 could be any suitable motor coupled to a sensor and would facilitate more precise control of the positioning of the slave manipulator assembly 12 and counteract gravity and inertia at the operator work station. Optionally, the servo motor 46 could resynchronize controller and manipulator joints after a mode switching event.

Figure 3A:
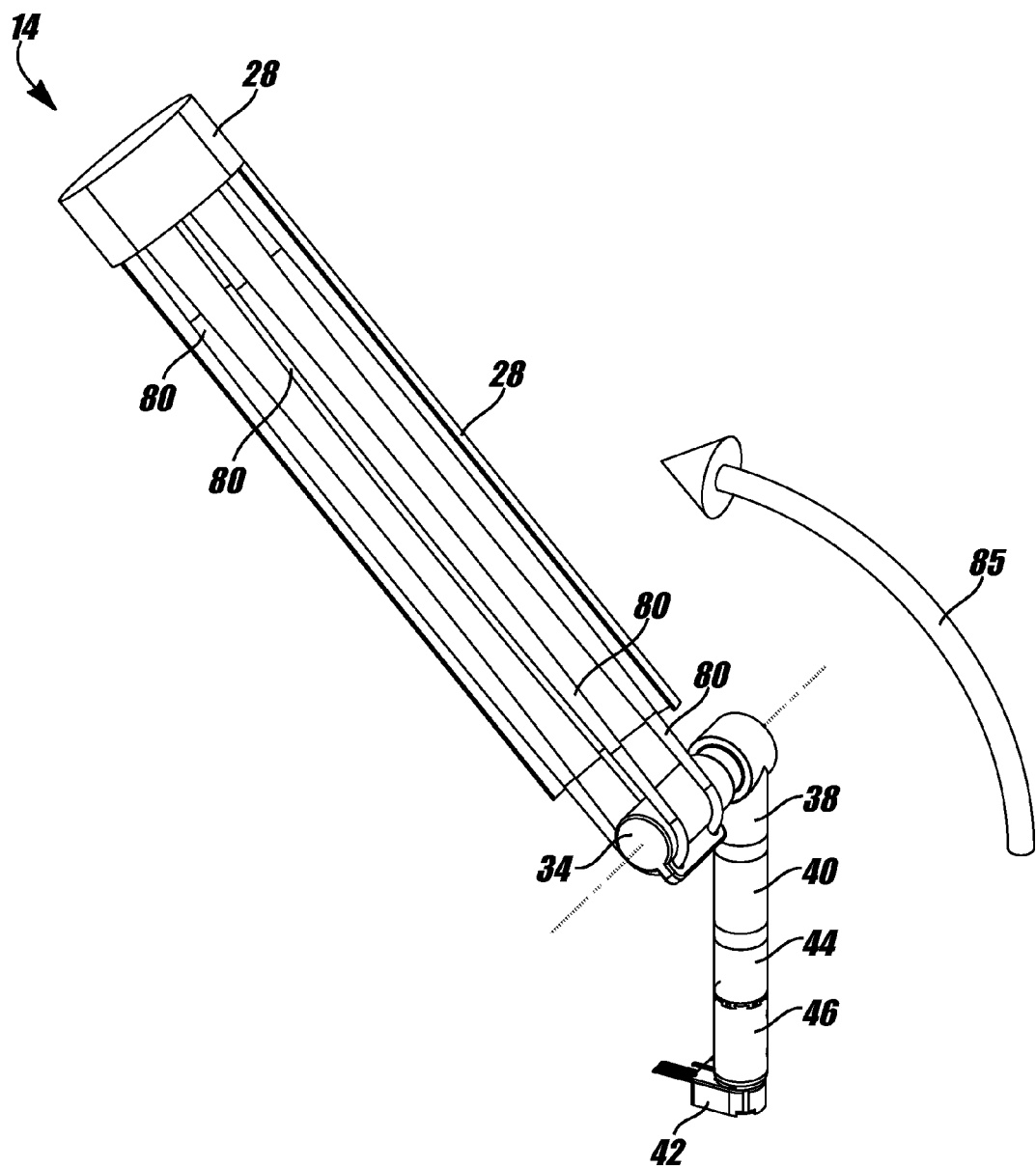
FIG. 3A is a perspective view of an exemplary embodiment of an electroactive polymer material controller assembly being acted on by an input force in accordance with the present disclosure.
Figure 3B:
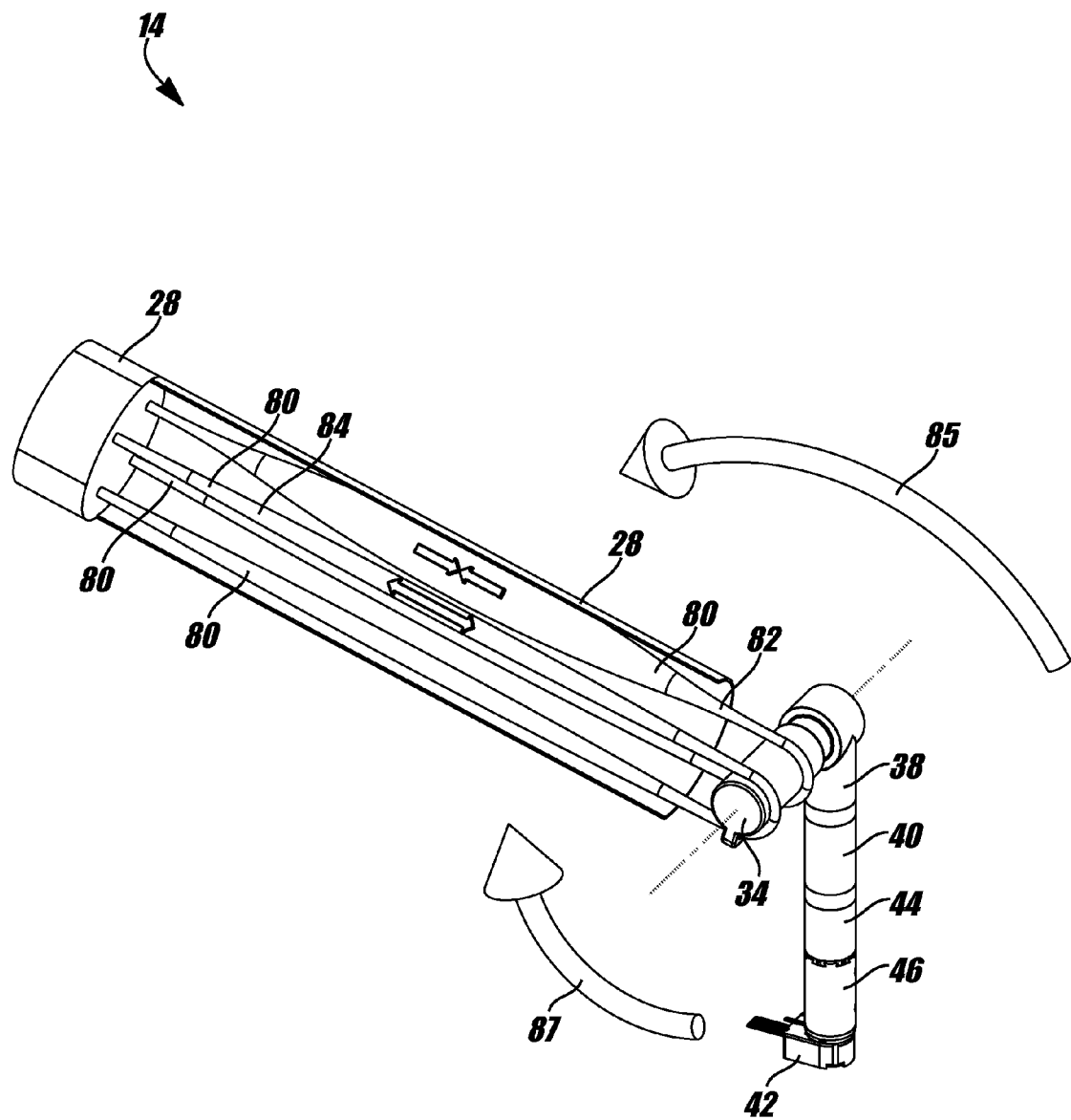
FIG. 3B is a perspective view of an exemplary embodiment of an electroactive polymer material controller assembly being acted on by input and feedback forces in accordance with the present disclosure.

It should be noted that, rather than a torque sensor, exemplary embodiments could provide the same functionality with electroactive polymer sensor actuators, which are sometimes referred to as robotic muscle. As shown in FIGS. 3A and 3B, EAP strands 80 could be connected to a master arm segment 28 on one end and the drive shaft 34 on the other, with some actuation strands 82 used for actuation and some sensing strands 84 used for sensing. As discussed in more detail herein, the operator can provide input force 85 on the controller assembly 14. Various configurations are possible, including the possibility to replace the torque sensor and drive-train assembly with various combinations of EAP materials and angular movement detectors.

Figure 4A:
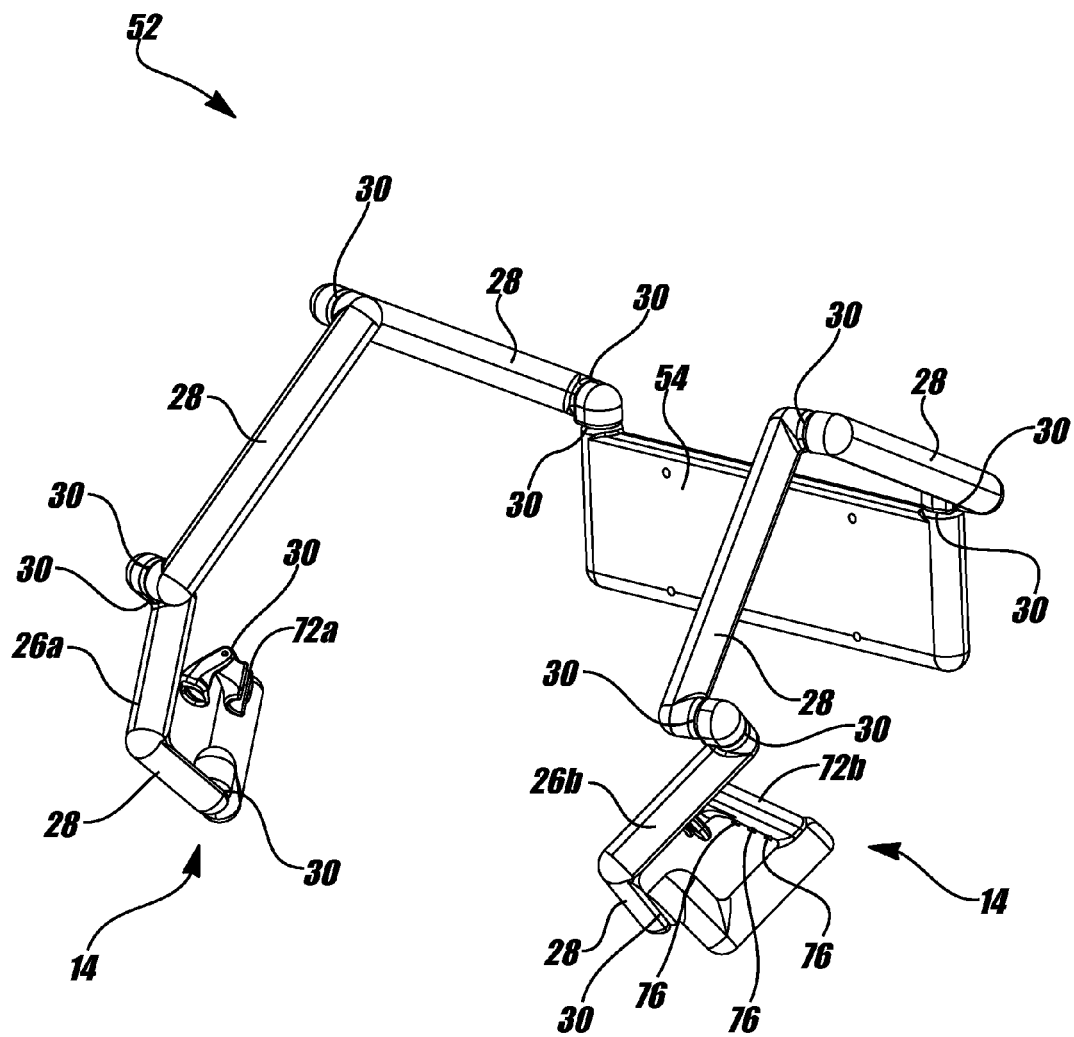
FIG. 4A is a front perspective view of an exemplary embodiment of an operator unit in accordance with the present disclosure.
Figure 4B:
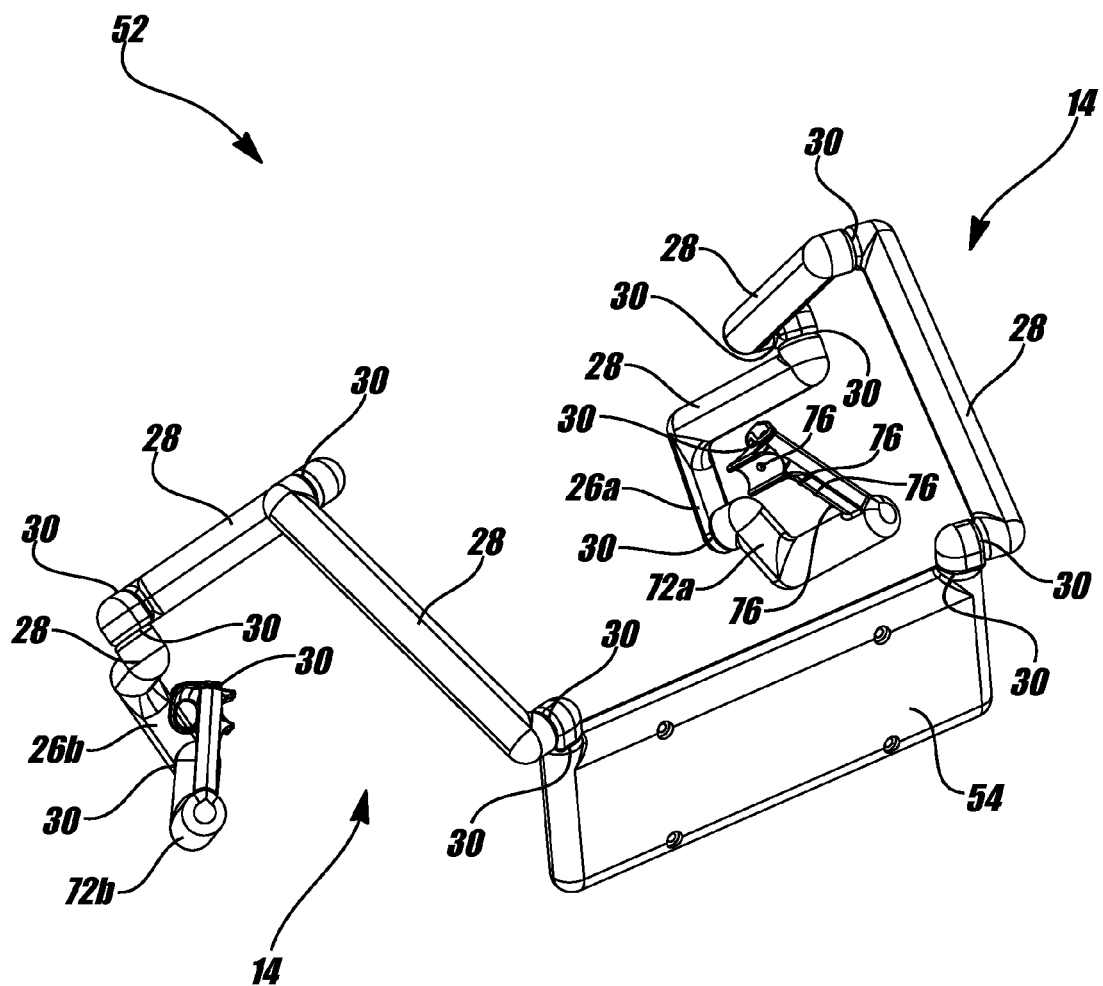
FIG. 4B is a rear perspective view of the operating unit of FIG. 4A.
Figure 4C:
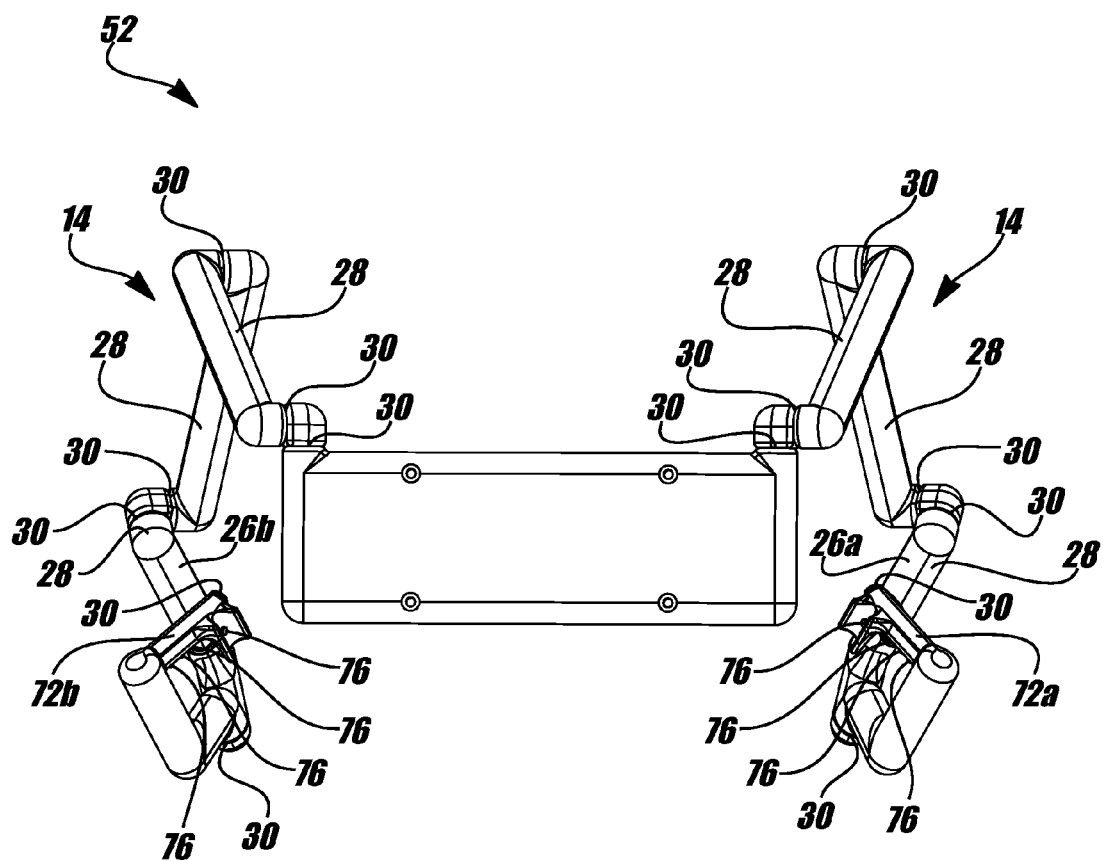
FIG. 4C is a rear view of the operating unit of FIG. 4A.

Turning to FIGS. 4A, 4B and 4C, an exemplary operator unit 52 comprises at least two master arm assemblies 14, with one being a right-handed master controller arm 26a and one being a left-handed master controller arm 26b. Each master controller arm 26a could comprise a respective hand controller 72a, 72b for the operator to grip and use for control. It should be noted that exemplary embodiments of master arm assemblies 14 are comprised of multiple movable arm segments 28, each possessing an angular measurement device such as a rotary encoder 42 on the proximal joint interface and an engagement mechanism 44 on the distal joint interface, where each movable arm segment 28 controls the position of a slave manipulator 12. At least one brake override button 76 could be provided. In exemplary embodiments, there are override buttons 76 on each hand controller 72a, 72b to allow for selectable brake engagement of individual joints, depending on the operator's preference of each joint's control mode for a given task. Brake overrides are activated via the push button 76, corresponding to a joint or multiple joints. For manipulator joints without angular movement detectors, such as for manipulator wrist roll and end effector movement, these functions' angles may initially be positioned by the operator, who determines their synchronization angle and calibrates zero degrees for these joints manually. The system remembers the calibrated angles for each joint until the joints' calibrated angles become desynchronized during operation. These joint angles can then be recalibrated as previously described.

Figure 5:
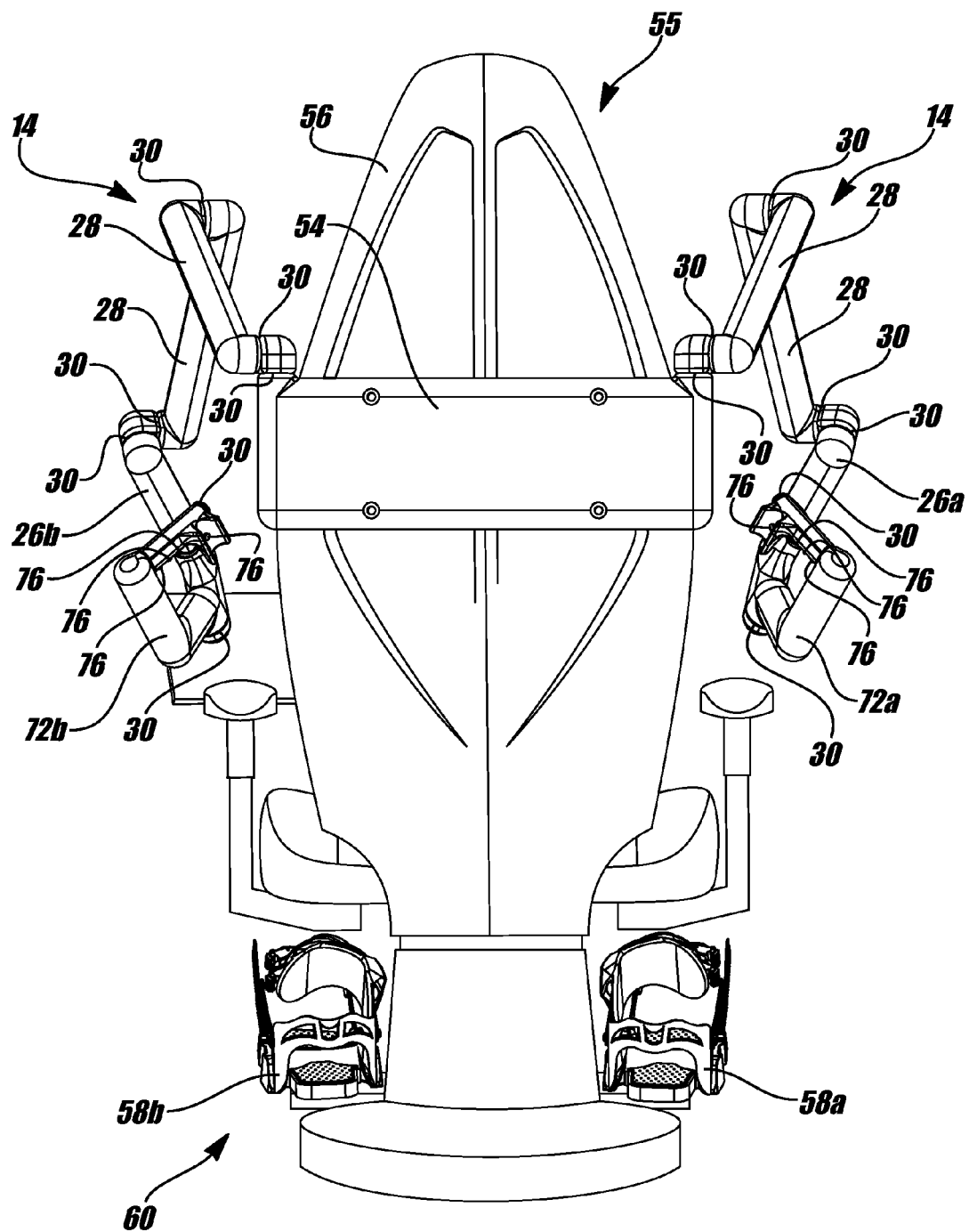
FIG. 5 is a rear view of an exemplary embodiment of an operator seating device in accordance with the present disclosure.
Figure 6:
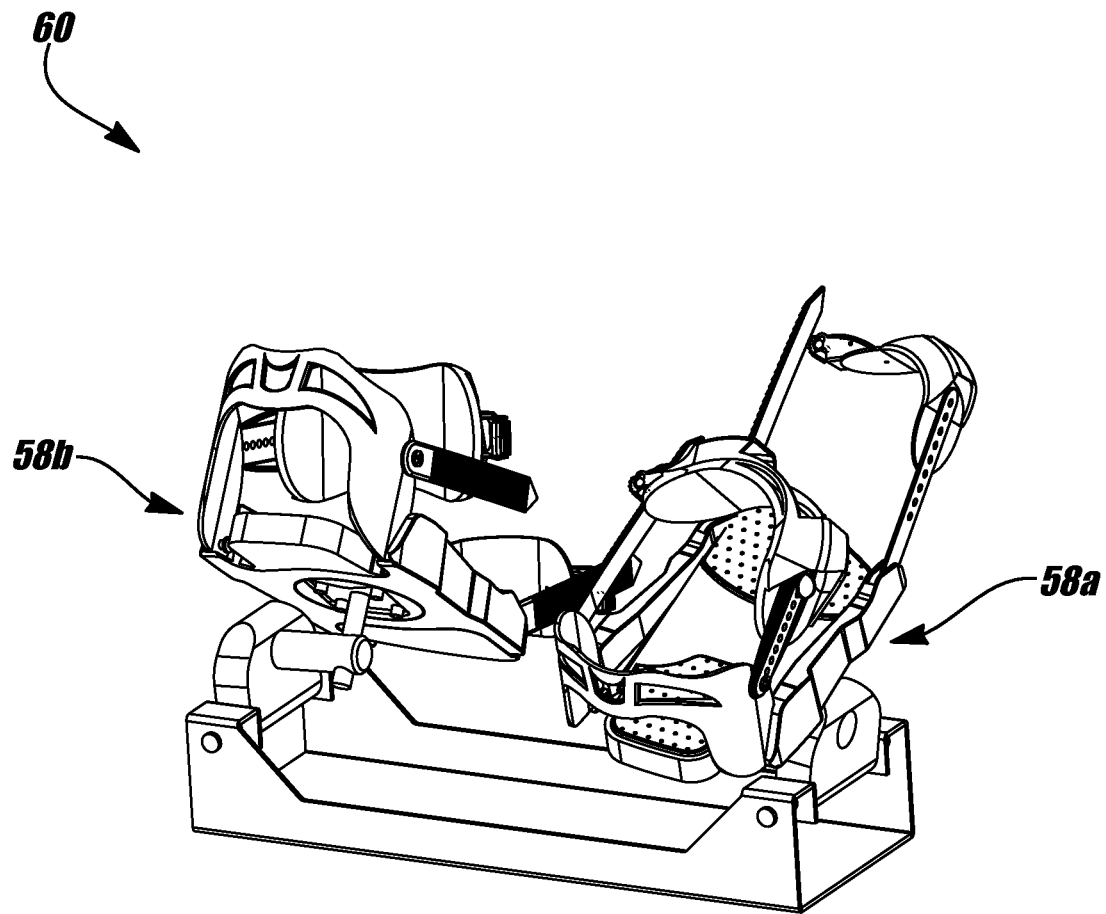
FIG. 6 is a perspective view of an exemplary embodiment of a foot controller in accordance with the present disclosure.

Each exemplary operator unit 52 may include a chair mount 54 to couple the master arm controllers to a portion of a chair or other seating device 55 that the operator sits on to operate the system. As shown in FIG. 5, in exemplary embodiments, the chair mount 54 couples the master arm assemblies 26a, 26b to a back support 56 of the seating device 55. Turning to FIG. 6, the operator unit 52 may also include a dual-pedal foot controller 60 that sends electronic signals based on pedal motion to a computer for manipulator, vehicle positioning and translation, or tooling control. In exemplary embodiments, one pedal is a right-footed controller pedal 58a and the other is a left-footed controller pedal 58b.

In exemplary embodiments, vehicle positioning and translation are controlled by pedal movements. The degree to which the pedals are moved from their neutral positions determines the degree to which the vehicle responds. The default pedal control movements can be changed to suit the operator, but for illustration purposes, are described in right-handed Cartesian coordinates as follows: Forward Surge (+X) is initiated by moving the right pedal in a toe down motion. Aft Surge (−X) is initiated by moving the right pedal in a toe up motion. Starboard sway (+Y) is initiated by rolling the inboard edge of the right pedal up and then in an outboard motion. Port sway (−Y) is initiated by rolling the inboard edge of the left pedal up and then in an outboard motion. Zenith heave (+Z) is initiated by moving the left pedal in a toe up motion. Nadir heave (−Z) is initiated by moving the left pedal in a toe down motion. Zenith yaw (+Yaw) is initiated by moving the right pedal in a toe left and heel right motion. Zenith yaw (−Yaw) is initiated by moving the right pedal in a toe right and heel left motion. In exemplary embodiments, the remaining pedal motions may be used for remote tool operation.

A controller computer or processor 66 may provide much of the control functionality of disclosed systems and methods. In exemplary embodiments, the controller computer 66 is in communication with the angular movement detector or other measurement device 42 and this line of communication links the one or more master arm assemblies 14 with the corresponding slave manipulator assemblies 12. More particularly, the angular movement detector 42 sends a joint position signal 67 to controller computer 66. The controller computer 66 may also be in communication with a rotary encoder or other measurement device 42 on a slave manipulator assembly 12. The slave manipulator assembly 12 may be in electronic or other type of communication with a pressure transducer 64, which may, in turn, be in communication with remote computer 75 and controller computer 66.

Advantageously, in exemplary embodiments of disclosed manipulator systems and methods, the slave manipulator assembly 12 provides feedback information 62 to the controller assembly 14 via remote computer 75 and controller computer 66, which are part of computer network 81. The feedback information 62 may include a measure of an amount of resistance, movement or other detectable change on the slave manipulator assembly 26. The measure of such resistance, movement or other detectable change may include, but is not limited to, one or more of pressure, electric force, electromagnetic force, acceleration, and/or torque, and/or any other type of resistance, movement, reaction force, environmental factor, or detectable change that could impact the positioning or activity of the slave manipulator assembly. In exemplary embodiments, resistance, movement or other detectable change on an affected joint 18 of the slave manipulator assembly 12 can propagate a slave manipulator hydraulic pressure transducer 64 output signal 83 or slave manipulator torque output signal to be communicated to the corresponding master arm joint 30. The brake 44 of the controller assembly 14 is then engaged by a computer 66 fixing the affected master arm segments to a torque sensor.

Exemplary embodiments also advantageously provide seamless automatic switching between at least two modes of operation without interrupting input motion during operation. More particularly, disclosed manipulator systems and methods can operate in spatially correspondent mode 90 or a type of rate control mode 92, as well as other modes of operations regulated by computer network 81, and automatically switch among the various modes. The types of rate control mode in which exemplary systems are operable include, but are not limited to, proportional rate control mode, rate mode, and variable rate mode, as well as any control mode other than spatially correspondent mode. In exemplary embodiments, the primary mode of operation is spatially correspondent mode 90, and disclosed systems and methods automatically switch to a type of rate control mode 92 when an amount of resistance, movement, or other detectable change on a slave manipulator assembly 12 meets or exceeds a threshold amount. The threshold amount or limit refers to a change or environmental force beyond the threshold that engages the auxiliary mode.

The switching may be achieved by a Boolean exclusive or function (XOR). When the amount of resistance, movement or other detectable change on the slave manipulator assembly 12 subsequently drops below the threshold amount, the system or method will automatically switch back to spatially correspondent mode. Having the ability to operate in an auxiliary control mode such as the more reliable type of rate mode is important for remotely operated systems being used in harsh environments, as they can experience signal or system failure events more regularly than typical remote systems.

It should be noted that exemplary embodiments may operate with any mode of operation being the primary mode of operation. For example, the primary mode of operation may be a type of rate control mode 92. This might be the case where the system or method begins operation with the amount of resistance, movement or other detectable change on a slave manipulator assembly 12 meeting or exceeding a threshold amount. In such instances, the system or method may automatically switch to spatially correspondent mode 90 (or other mode) when the amount of resistance, movement or other detectable change on the slave manipulator assembly 12 drops below the threshold amount. If the amount of resistance, movement or other detectable change on the slave manipulator assembly 12 subsequently increases to meet or exceed the threshold amount, the system or method would again automatically switch to a type of rate control mode 92.

In operation of exemplary embodiments, the operator sits in the operator unit 52 and grasps the right-handed master controller arm 26a with his or her right hand and the left-handed master controller arm 26b with the left hand. The operator may also rest his or her right foot on the right-footed controller pedal 58a and the left foot on the left-footed controller pedal 58b. The operator grips hand controllers 72a, 72b with his or her right and left hand, respectively, and moves each controller assembly 14a or 14b to control the corresponding slave manipulator assembly 12 in the slave manipulator work environment.

Figure 7:
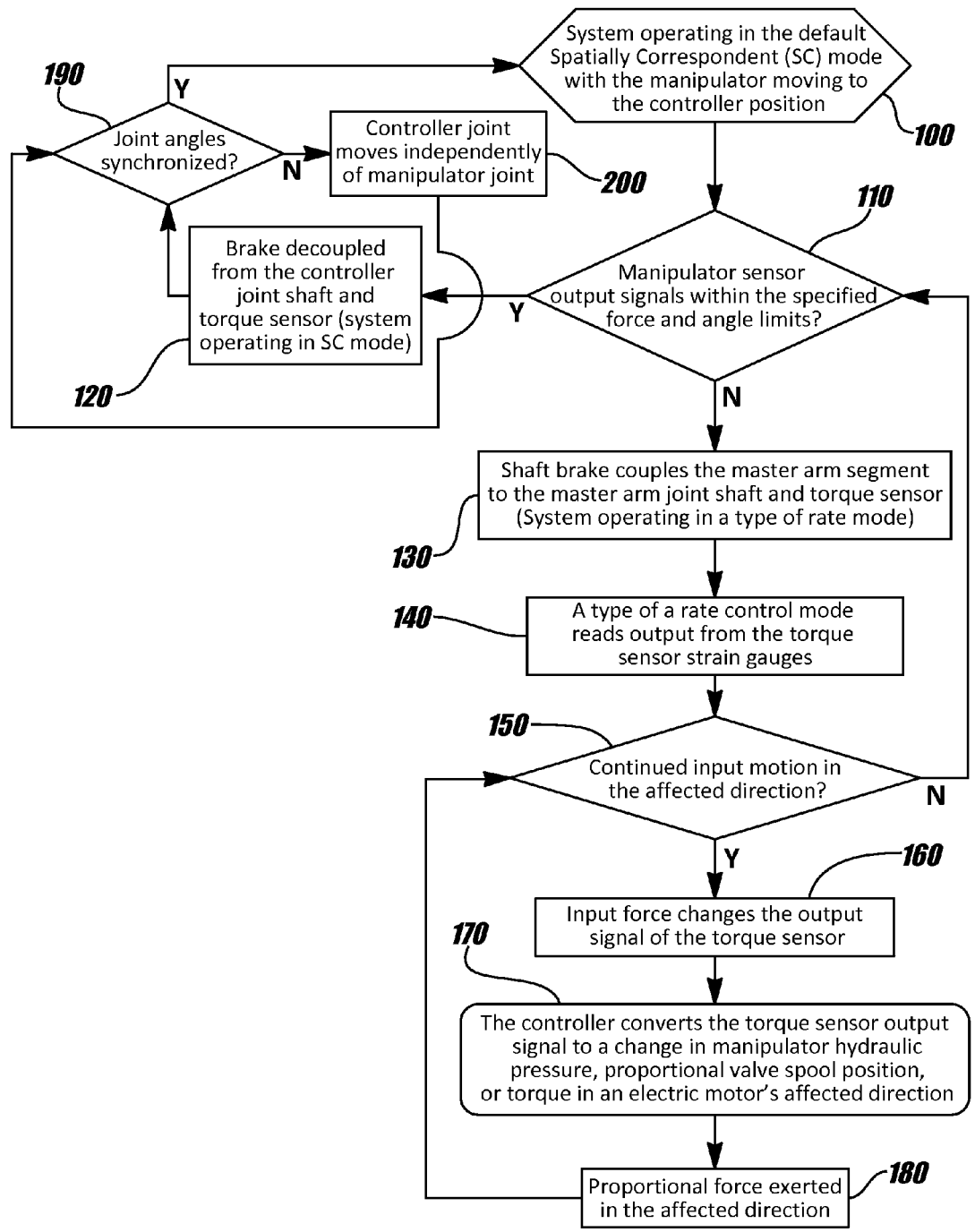
FIG. 7 is a process flow diagram showing exemplary mode switching functionality in accordance with the present disclosure.

With reference to FIG. 7, exemplary mode switching functionality will now be described. In exemplary embodiments where the amount of resistance, movement or other detectable change on one or more slave manipulator assemblies 12 is initially below a threshold amount, the primary or default mode of operation is spatially correspondent mode 90 (also shown as step 1100 in an exemplary embodiment illustrated in FIG. 9). In spatially correspondent mode, at step 100 (also shown as step 1100 an exemplary embodiment illustrated in FIG. 9), the slave manipulator assembly 12 moves to the corresponding controller assembly 14 position. If the slave manipulator sensor output signals are below the specified threshold, as indicated by the manipulator sensor output signals in step 110, computer 66 maintains the state of the servo brake to be disengaged. In this state, the servo brake is decoupled from the master arm segment, joint shaft and torque sensor, maintaining operation in spatially correspondent mode, in step 120. If the slave manipulator sensor output signals meet or exceed the specified threshold, controller computer 66 regulates the initially available slave hydraulic pressures to lowered energy states via proportional valves 69 until a type of rate control mode 92 is engaged. At this point (step 130), the engagement mechanism or shaft brake 44 couples the controller assembly joint segment to the joint shaft and torque sensor 36.

At this point, the torque-sensor output voltages can simultaneously control both the hydraulic cylinder extension or rotation and pressures to the cylinders controlling the affected joints. Once the torque sensor input is recognized by the computer, the full range of variable rate power becomes available. In step 140, the type of rate control mode reads the output from the torque sensor 36 strain gauges. In exemplary embodiments, the amount of power provided (i.e., sensitivity) can be adjusted. Advantageously, this functionality enables free-moving ROVs to maintain position more easily during environmental impacts and allows more precise manipulator motion during automated tasks, as it is not as taxing on the ROV positioning control system.

As mentioned above, when the slave manipulator assembly 12 impacts its environment during motion and one or more of the hydraulic pressure sensors 64 on the controller assembly 14 detects an amount of resistance, movement or other detectable change that meets or exceeds a threshold amount, this discrepancy causes the corresponding controller assembly brake 44 (whose operational axis is perpendicularly fixed to the torsional spring on the opposing arm segment) to engage the rotary encoder shaft, which locks the entire joint 18 to a torsion spring and torque sensor 36 fixing the arm segments 16 together. More particularly, when the slave manipulator hydraulic pressure transducer output signal 83 or slave manipulator torque output signal of the affected joint increases or decreases beyond a specified limit, the interdependent master arm joint shaft brake 44 is engaged by a computer 66, fixing the affected master arm segments 28 to the energy absorbing (torsion) spring 78.

As the slave manipulator segments 16 continue to rotate further from the joint position where the resistance (step 150), movement or other detectable change limit was exceeded, this motion is recognized by control computer 66, which engages a type of rate control mode by activating the corresponding master arm joint's rate control mode indicator switching the affected joint 30 from its nominal control mode of spatially correspondent control to its secondary control mode of a type of rate control. In exemplary embodiments, the controller computer 66 is configured to select a type of rate control. Advantageously, the type of rate control mode lock is capable of being engaged for any joint at any time. For instance, the slave manipulator wrist role may be operated electronically and mode switching may be digital to allow for continuous wrist role via engagement of a push button and simultaneous controller roll beyond a specified number of degrees. Alternatively, the operator could manually rotate the hand controller 72.

Exemplary embodiments may define unilateral control, which provides the ability for the controller to move the manipulator. Exemplary embodiments may activate bilateral control, which provides the ability not only for the controller to move the manipulator, but also for the manipulator to move the controller. It should be noted that exemplary embodiments provide hybrid (multi-lateral), and not only purely unilateral or bilateral, feedback. However, being a hybrid system does not preclude the system from controlling only hydraulic or only electric actuation. In the case of electric actuation, in exemplary embodiments, the switch from spatially correspondent control to a type of rate control may be propagated via an electrical voltage or magnetism signal threshold breach which could be processed from the motor directly or a separate sensor. While these types of joints can either be spatially correspondent or a type of rate control in the disclosed system, their rotation can be continuous, as mentioned above.

In exemplary embodiments that include a rotational energy absorber, when the brake 44 is engaged, the rotational resistance of the torsion spring 78 could be overcome, step 160, so the full measurable rotational force would be transferred into the torque sensor 36. This would also serve to communicate to the operator, via the initial spring resistance, that the control mode has switched, while providing a slight rotational buffer, before continuing manipulator motion. It should be noted, however, that the torsion spring 78 does not necessarily need to be overcome to a hard stop. The torque sensor output signal could be modified via code to not respond to values within a certain limit and scale everything outside of the limit accordingly. Advantageously, this would still allow for a slight rotational buffer or damping of engagement and disengagement. It should also be noted that the system operates this way in either rotational direction.

Advantageously, use of the torsion spring 78 may alleviate chattering (quick, repeated engagement and disengagement) of the brake caused by situations in which the force (hydraulic pressure, EAP tension, or other) on the slave manipulator assembly 12 hovers around the predetermined threshold In addition, such chattering could also be tempered with software code.

At step 170, the affected slave manipulator joints 18 are operated in a type of rate control mode until the affected joint's pressures or torque signals return to acceptable limits. If, after brake engagement, the master arm joint rotation continues in the affected direction, step 150, and the reaction force 87 of the torque-sensor spring is overcome in either direction, then the computer 66 continues to operate the slave manipulator 12 via a type of rate control in the affected joint 18 exerting a proportional force in the affected direction, step 180, until the slave manipulator hydraulic pressure transducer or slave manipulator electric motor torque output signal of the affected joint 18 decreases below a specified limit, which causes the brake 44 to disengage. When the brake 44 disengages, the affected joint 18 returns to its nominal operating configuration of spatially correspondent control, the rate control indicator is turned off, and the system resumes primary control mode of spatially correspondent operation, step 120.

The master arm moves independently of the slave manipulator (steps 190 and 200) until the master and slave manipulator joint angles resynchronize. More particularly, although the affected joint 18 has returned to its default control mode, the slave manipulator assembly 12 does not resume movement until the affected joint 30 of the controller assembly 14 is resynchronized with the affected joint 18 of the slave manipulator 12. In exemplary embodiments, the system is resynchronized by moving the affected master controller joint 30 until its joint angle matches that of the corresponding slave manipulator joint 18. If any joints' brake override buttons 76a, 76b are depressed, a type of rate control mode is activated in the corresponding joints until a type of rate control mode is deactivated by depressing the corresponding override button again.

In the hybrid configuration, when the brake override button is activated the system forces step 130. In the bilateral configuration, when the brake override button is activated (step 1125) the system forces step 1130, shown in FIG. 9, except that neither brake decouples either joint shaft in a brake override event. Both brakes become activated and controller input motion works directly on the torque sensor (step 1126). In exemplary embodiments, the system could position the master controllers 14 to match the slave manipulators 12 after a return to spatially correspondent mode 90. It should be noted that, with use of EAP materials as discussed above with reference to FIGS. 3A and 3B, the mode switching could be entirely digital. If it is preferable for a task, there may be an option to engage bilateral control.

Figure 9:
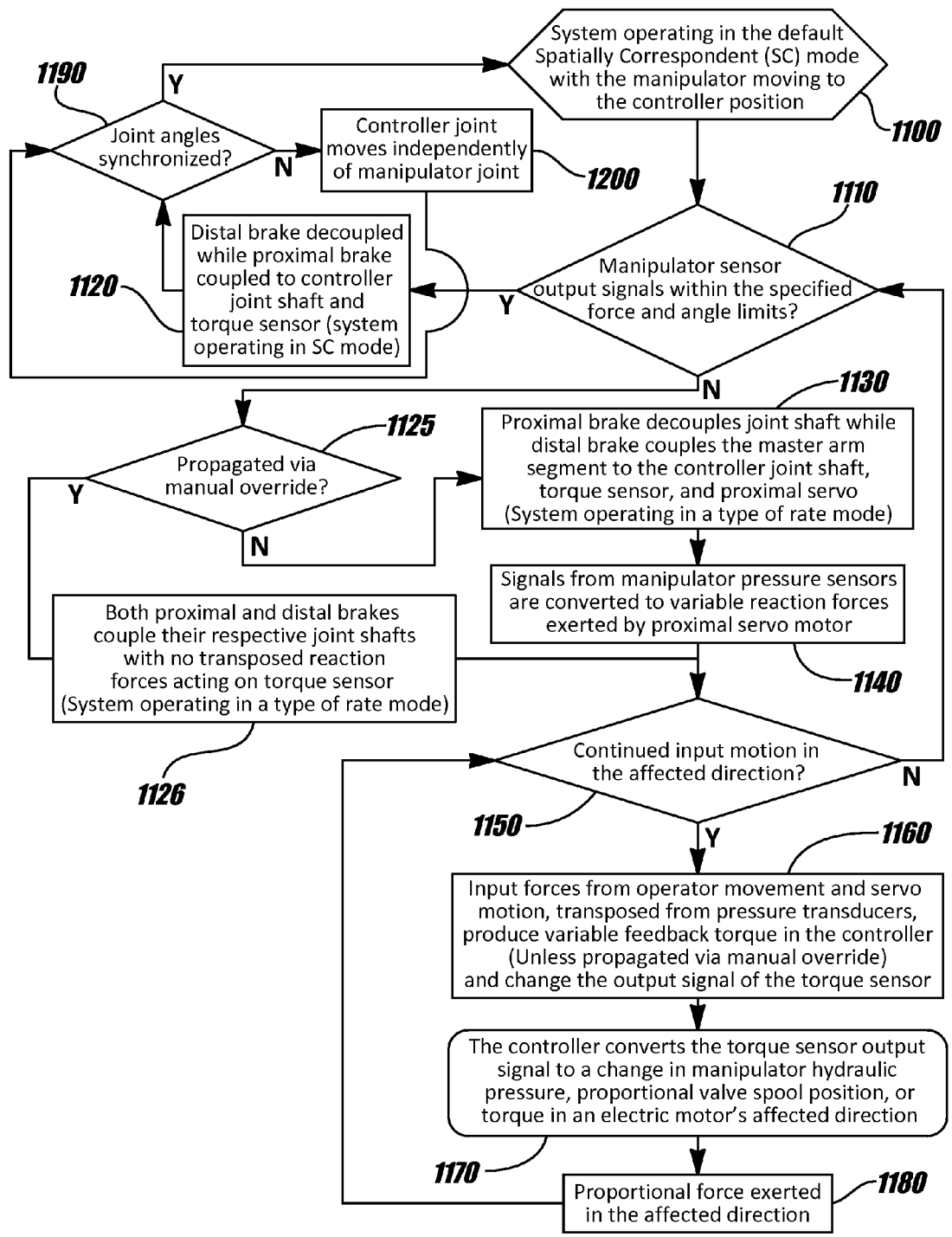
FIG. 9 is a process flow diagram showing exemplary mode switching functionality and feedback methodology in accordance with the present disclosure.
Figure 10:
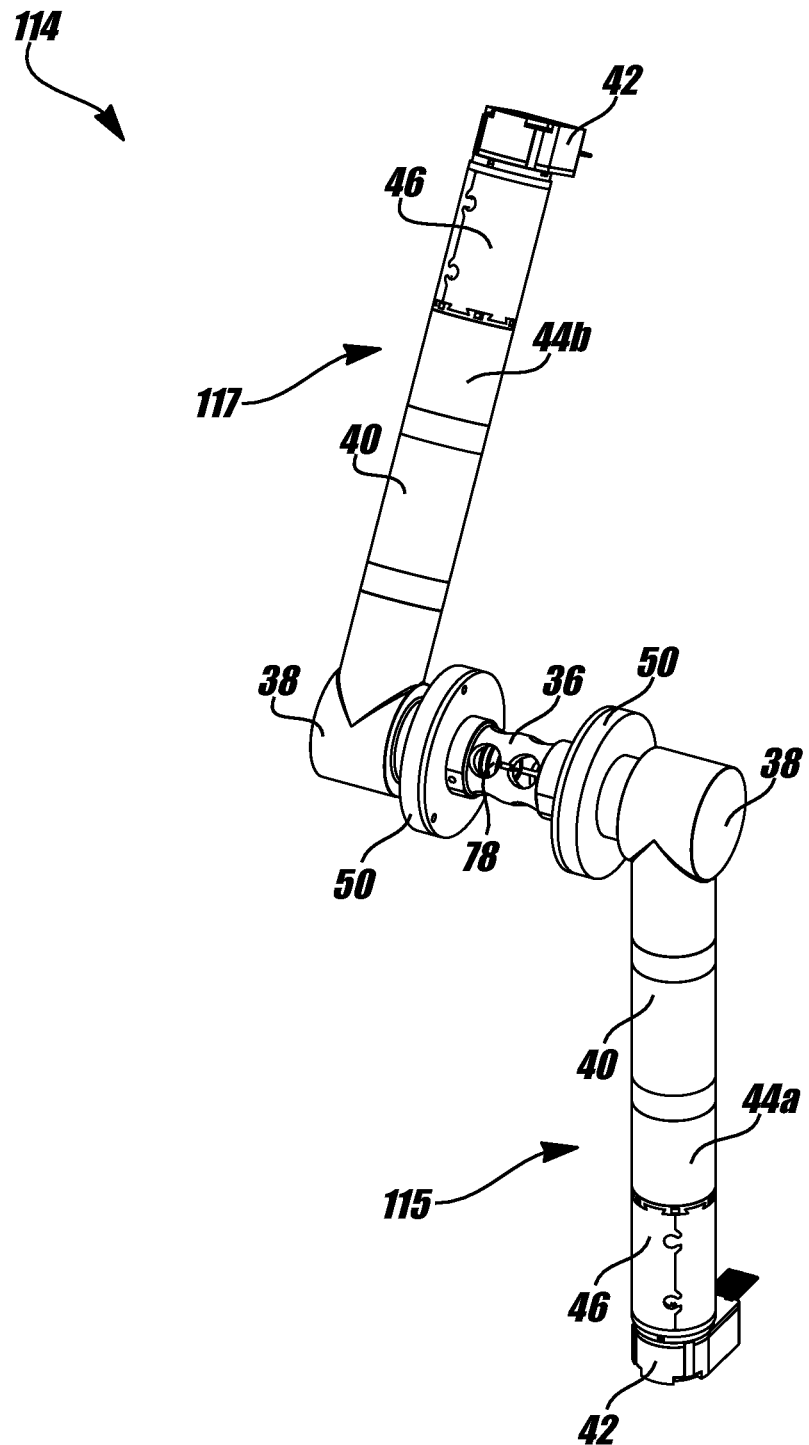
FIG. 10 is a perspective view of an exemplary embodiment of a force feedback controller assembly in accordance with the present disclosure.

Referring now to FIGS. 9 and 10, in exemplary embodiments the system may provide bilateral feedback by rotating an entire proximal controller joint and torque sensor towards or away from the perpendicular distal joint assembly shaft to either create or remove controller feedback forces. These bilateral feedback embodiments share some process steps with the embodiments of FIG. 7, but also have significant distinctions. As shown in FIG. 10, a controller assembly 114 having a proximal shaft 115 and a distal shaft 117 may be provided. Advantageously, the controller assembly 114 comprises a proximal engagement mechanism or brake 44a and a distal engagement mechanism or brake 44b.

After a manipulator joint position signal 62 breaches the predetermined force or angle limits, the proximal engagement mechanism 44a in the affected joint 18 decouples the proximal joint shaft 115 while the distal engagement mechanism 44b of the affected joint 18 couples the controller assembly segment to the distal controller joint shaft 117, torque sensor 36, and proximal servo and angular measuring device in the affected joint (step 1130). At this point, the affected joint 18 in the system is operating in a type of rate control mode in which signals from the manipulator pressure sensors are converted to variable reaction forces exerted by the proximal servo motor 46 on the affected controller joint 18 (step 1140).

If continued controller input force (joint rotation) 85 is detected rotating in the affected direction (step 1150), or if remote manipulator 12 force and angle limits continue to deviate from where the predetermined limit was breached after the type of rate mode has been engaged (1130), then input forces 85 from the operator on the distal segment 28 of the joint 30 and transposed reaction forces 87 from the servo motor 46 in the proximal segment 28 of the joint 30 (transposed and converted from the manipulator pressure transducer signals 83) cause a rotation which produces variability in the feedback forces 87 in the affected controller joints 28 by rotating the damper spring 78 and torque sensor 36 of the affected joint against or away from the locked shaft of the distal controller arm segment 28. These combined forces change the output signals of the torque sensors 36 accordingly (step 1160).

The controller computer then converts the torque sensor output signal 71 into a change in the manipulator's corresponding hydraulic proportional valve spool position (controlling the degree and direction in which hydraulic pressure is exerted) or a change of torque in an electric motor's affected direction (step 1170), which creates a proportional force exerted by the manipulator in the affected direction (step 1180). During this process, hydraulic pressure regulated by the proportional valve is exerted through cylinder extension hydraulic line 77. Hydraulic pressure is also returned to the proportional valve through the cylinder retraction hydraulic line 79.

If controller input motion 85 is detected rotating away from the affected direction returning to the point of engagement, or if manipulator force and angle limits return from where the predetermined limit was breached after the type of rate control mode has been engaged, then input forces 85 from operator movement and the servo motions (which motions are transposed from the manipulator pressure transducers) produce variable feedback forces 87 in the affected controller joints and change the output signals of the torque sensors until such time as the sensor signals 71 return to within the predetermined force and angle limits. When the system sensor signals 71 and 83 return to within the predetermined angle and force limits (step 1110), the system returns to the spatially correspondent mode 90 of operation and the affected joint angles resynchronize by one of the previously stated options, as shown in steps 1120, 1190 and 1200.

Thus, it is seen that improved manipulator systems and methods of controlling remotely operated systems are provided. It should be understood that any of the foregoing configurations and specialized components may be interchangeably used with any of the apparatus or systems of the preceding embodiments. Although illustrative embodiments are described hereinabove, it will be evident to one skilled in the art that various changes and modifications may be made therein without departing from the scope of the disclosure. It is intended in the appended claims to cover all such changes and modifications that fall within the true spirit and scope of the disclosure.

What is claimed is:

1. A manipulator system comprising:
   at least one slave manipulator assembly;
   at least one controller assembly in communication with the slave manipulator assembly, the controller assembly being configured to remotely operate the slave manipulator assembly;
   wherein the slave manipulator assembly provides feedback information to the controller assembly, the feedback information including a measure of an amount of resistance or movement on the slave manipulator assembly; and
   wherein the controller assembly moves independently of the slave manipulator assembly until a joint position of the slave manipulator assembly is synchronized with a joint position of the controller assembly.

2. The manipulator system of claim 1 further comprising a right-footed master device and a left-footed master device.

3. The manipulator system of claim 1 wherein the controller assembly is an actuator sensor system.

4. The manipulator system of claim 3 wherein the actuator sensor system comprises electroactive polymer material.

5. The manipulator system of claim 3 wherein the actuator sensor system comprises a drive train assembly.

6. The manipulator system of claim 5 wherein the drive train assembly comprises:
   a drive shaft;
   a torque sensor connected to the drive shaft;
   a drive device connected to the drive shaft;
   a gear drive connected to the drive device;
   an engagement mechanism connected to the drive device; and
   an angular movement detector connected to the drive device.

7. The manipulator system of claim 6 wherein the engagement mechanism includes a series of electroactive polymer materials.

8. The manipulator system of claim 1 wherein the system is configured to automatically switch between at least two modes of operation.

9. The manipulator system of claim 8 wherein a primary mode of operation is spatially correspondent mode, and the system automatically switches to a type of rate control mode when the amount of resistance on the slave manipulator assembly meets or exceeds a threshold amount of resistance.

10. The manipulator system of claim 9 wherein the system automatically switches to spatially correspondent mode when the amount of resistance or movement on the slave manipulator assembly drops below the threshold amount of resistance or movement.

11. A manipulator system comprising:
    at least one slave manipulator assembly;
    at least one controller assembly in communication with the slave manipulator assembly and configured to remotely operate the slave manipulator assembly, the controller assembly moving independently of the slave manipulator assembly until a joint position of the slave manipulator assembly is synchronized with a joint position of the controller assembly;
    the system being configured to automatically switch between at least two modes of operation when an amount of resistance or movement on the slave manipulator assembly fluctuates above and below a threshold amount of resistance or movement on the slave manipulator assembly.

12. The manipulator system of claim 11 wherein the system is operable in spatially correspondent mode or a type of control mode, the primary mode of operation being spatially correspondent mode.

13. The manipulator system of claim 12 wherein the system automatically switches to a type of rate control mode when the amount of resistance or movement on the slave manipulator assembly meets or exceeds the threshold amount of resistance or movement.

14. The manipulator system of claim 13 wherein the system automatically switches to spatially correspondent mode when the amount of resistance or movement on the slave manipulator assembly drops below the threshold amount of resistance or movement.

15. The manipulator system of claim 12 wherein the slave manipulator assembly provides feedback information to the controller assembly, the feedback information including a measure of the amount of resistance or movement on the slave manipulator assembly.

16. The manipulator system of claim 11 wherein the controller assembly includes an engagement mechanism that engages when the amount of resistance or movement on the slave manipulator assembly meets or exceeds the threshold amount of resistance or movement.

17. The manipulator system of claim 16 wherein the engagement mechanism disengages when the amount of resistance or movement on the slave manipulator assembly drops below the threshold amount of resistance or movement.

18. The manipulator system of claim 11 wherein the controller assembly is an actuator sensor system comprising a drive train assembly;

wherein the drive train assembly comprises:
a drive shaft;
a torque sensor connected to the drive shaft;
a drive device connected to the drive shaft;
a gear drive connected to the drive device;
an engagement mechanism connected to the drive device; and
an angular movement detector connected to the drive device.

19. A method of controlling a remotely operated system, comprising:
using a controller assembly to control and position a slave manipulator assembly, the controller assembly moving independently of the slave manipulator assembly until a joint position of the slave manipulator assembly is synchronized with a joint position of the controller assembly;
receiving feedback information from the slave manipulator assembly, the feedback information including a measure of resistance or movement on the slave manipulator assembly;
automatically switching between at least two modes of operation when an amount of resistance or movement on the slave manipulator assembly fluctuates above and below a threshold amount of resistance or movement on the slave manipulator assembly.

20. The method of claim 19 further comprising operating in spatially correspondent mode if the amount of resistance or movement on the slave manipulator assembly remains below the threshold amount of resistance or movement; and
automatically switching to operation in a type of rate control if the amount of resistance or movement on the slave manipulator assembly meets or exceeds the threshold amount of resistance or movement.

21. The method of claim 19 further comprising:
engaging a braking mechanism when the amount of resistance or movement on the slave manipulator assembly meets or exceeds the threshold amount of resistance or movement; and
decoupling a braking mechanism when the amount of resistance or movement on the slave manipulator assembly drops below the threshold amount of resistance or movement.

* * * * *